E. MILLER.
Carriage-Step.
No. 69,465.
Patented Oct. 1, 1867.
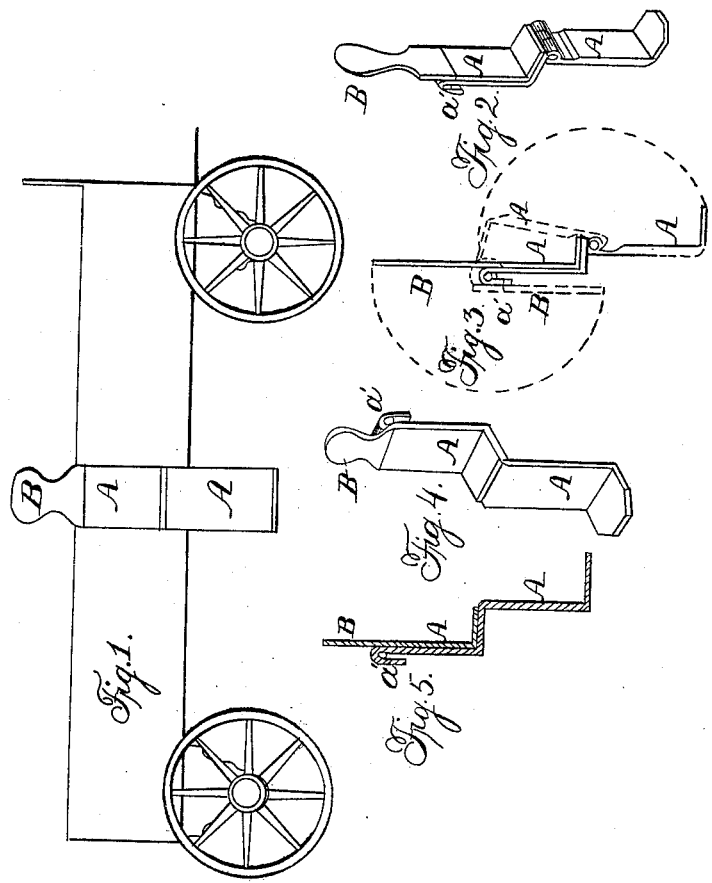

United States Patent Office.

EDWARD MILLER, OF MILWAUKEE, WISCONSIN.

Letters Patent No. 69,465, dated October 1, 1867.

IMPROVEMENT IN SHIFTING STEP FOR VEHICLES.

*The Schedule referred to in these Letters Patent and making part of the same.*

TO ALL WHOM IT MAY CONCERN:

Be it known that I, EDWARD MILLER, of Milwaukee, Milwaukee county, Wisconsin, have invented a new and improved Shifting Step for Vehicles; and I do hereby declare that the following is a full, clear, and exact description thereof, which will enable others skilled in the art to make and use the same, reference being had to the accompanying drawings, forming a part of this specification, in which—

Figure 1 is a side view of a wagon to which my improvement has been attached.

Figure 2 is a perspective view of my improved step.

Figure 3 is an edge view of the same.

Figure 4 is a perspective view of a modification of my improved step.

Figure 5 is a sectional view of the same.

Similar letters of reference indicate corresponding parts.

My invention has for its object to furnish an improved shifting or detachable step for attachment to vehicles, to enable persons, and especially ladies, to get in and out conveniently; and it consists in an improved shifting step, formed with a hook or flange upon its upper end, for hooking upon the upper edge of the wagon-box, and in the combination of a hinged handle or top piece with said step, the whole being constructed and arranged as hereinafter more fully described.

A is the main part of the step, which I generally prefer to make with two steps, as shown in the drawings. Upon the rear side of its upper end is formed a hook or flange, $a'$, which hooks over the upper edge of the wagon-box, as shown in fig. 1. The upper end of the upright part of the lower step is hinged to and beneath the outer edge of the second step, as shown in figs. 2 and 3, so as to make the connection rigid when the step is fully open. B is the handle or top of the step, which is hinged to the upper end of the step A in such a way that when drawn outward by the person who is mounting the step taking hold of it, the connection may be rigid, but which may be easily folded or turned back so as to hang down upon the inner side of the box out of the way. In the case of ladies getting into the wagon, the part B serves as a handle to assist them in mounting the step, and as they rise above it, and it is no longer needed as a handle, their skirts pushing against it will fold it over so as to be wholly out of the way in stepping into the wagon-box. The main part A, instead of being made jointed, as hereinbefore described, may be made rigid, as shown in figs. 4 and 5. But I prefer to make it jointed, as this construction enables it to be folded up into a smaller compass, making it more convenient for being carried in the wagon.

In using the step A B, it may be attached to the side of the wagon-box, as shown in fig. 1, or it may be attached to the rear end, or to any other part of the box that the circumstances of each case may render most convenient or advisable.

This invention is designed especially for use upon farmers' wagons, and in new sections of the country, where the roughness and unfinished state of the roadways render it impossible to have projecting steps permanently attached to the wagon.

Having thus described my invention, what I claim as new, and desire to secure by Letters Patent, is—

1. I claim an improved shifting step, A, formed with a hook or flange, $a'$, upon its upper end, substantially as herein shown and described, and for the purpose set forth.

2. The combination of the hinged handle or top piece B with the step A, substantially as herein shown and described, and for the purpose set forth.

The above specification of my invention signed by me this    day of May, 1867.

EDWARD MILLER.

Witnesses:
 ALEX. F. ROBERTS,
 JAMES T. GRAHAM.